United States Patent [19]

Sato et al.

[11] Patent Number: 5,397,668
[45] Date of Patent: Mar. 14, 1995

[54] DEVELOPER COMPOSITION FOR ELECTROSTATIC LATENT IMAGES

[75] Inventors: Yukiya Sato; Hisakazu Tajima; Yoshihiro Ueno; Kouji Kameyama; Masayoshi Nawa, all of Wakayama, Japan

[73] Assignee: Kao Corporation, Tokyo, Japan

[21] Appl. No.: 89,189

[22] Filed: Jul. 12, 1993

[30] Foreign Application Priority Data

Jul. 15, 1992 [JP] Japan .................................. 4-187966
Sep. 3, 1992 [JP] Japan .................................. 4-235975

[51] Int. Cl.⁶ .............................................. G03G 9/08
[52] U.S. Cl. ...................................... 430/108; 430/110
[58] Field of Search ........................ 430/109, 110, 108

[56] References Cited

U.S. PATENT DOCUMENTS 4,940,644  7/1990  Matsubara et al. ............... 430/109
5,112,689  5/1992  Ueno et al. ...................... 428/407

*Primary Examiner*—John Goodrow
*Attorney, Agent, or Firm*—Birch, Stewart Kolasch & Birch

[57] ABSTRACT

A developer composition comprising a carrier, whose surface layer comprises a silicone resin having a urethane bond, and a toner, which is little affected by environmental factors, so that it can develop good electrostatic latent images even under low-temperature and low-humidity conditions and under high-temperature and high-humidity conditions, to give high-quality prints.

12 Claims, No Drawings

DEVELOPER COMPOSITION FOR ELECTROSTATIC LATENT IMAGES

BACKGROUND OF THE INVENTION

1. Field of the Invention

The present invention relates to a two component developer composition useful in magnetic brush development which exhibits high performance even under low-temperature and low-humidity conditions and under high-temperature and high-humidity conditions.

2. Description of the Related Art

The electrostatic chargeability of a toner is an important factor on the quality of the resulting print. However, this electrostatic chargeability varies depending upon the environmental temperature and humidity, which causes a problem in that the quality of a print is so affected by environmental factors as to be deteriorated under low-temperature and low-humidity conditions owing to an increase of the electric charge of the toner or under high-temperature and high-humidity conditions owing to a decrease thereof.

The binder resin used in the preparation of a toner includes polystyrene; styrenic copolymers, such as styrene-butadiene copolymer and styrene-acrylic copolymer; polyethylene; ethylenic copolymers such as ethylene-vinyl acetate copolymer; poly(meth)acrylate; polyester; epoxy resin; and polyamide resin. In electrophotography, a polyester is widely used as a binder resin for toners by virtue of its excellent fixability and negative chargeability. Further, the superiority of a polyester is widely supported in the field of color toners from the standpoints of not only fixability and negative chargeability, but also transparency. Under these circumstances, it has been expected to develop a toner or a developer composition which exhibits the excellent characteristics inherent in a polyester and is little influenced by environmental factors.

For the purpose of preparing such a toner or a developer composition, there have recently been disclosed processes for modifying the polyester, for example, a process of controlling the acid value of the polyester (process 1), a process of controlling the sum total of the acid value and hydroxyl value of the polyester (process 2), a process of displacing the carboxyl groups of the polyester with nitrogenous functional groups (process 3), a process of surface-treating a toner comprising a polyester having a low acid value and a low hydroxyl value to make it hydrophobic (process 4), and so on.

However, the processes 1 and 2 are disadvantageous in that the resulting toner is poor in fixability because the modified polyester has a decreased content of polar groups, such as carboxyl groups. Further, it has been pointed out with respect to the process 3 that when the resulting toner is negatively charged, an increase of fog and a lowering in the transfer efficiency occur.

SUMMARY OF THE INVENTION

An object of the present invention is to provide a high-performance developer composition excellent in environmental characteristics. More specifically, the object is to provide a developer composition which exhibits the excellent fixability, negative chargeability and transparency inherent in a polyester and is little influenced by environmental factors.

The present inventors have extensively studied to find that a developer composition which comprises a carrier and a toner and wherein the surface of the carrier comprises a silicone resin having a urethane-bond, particularly one having a urethane-bond and a crosslinked structure, is little influenced by environmental factors, and gives a high-quality print. The present invention has been accomplished on the basis of this finding.

Thus, the present invention provides a developer composition for electrostatic latent images which comprises a carrier, comprising a core material and a surface layer, and a toner, comprising a binder resin and a colorant, wherein the surface of the core material is coated with a surface layer comprising a silicone resin having a urethane bond, that is, a urethane-modified silicone.

Namely, the present invention relates to a developer composition for electrostatically charged images which comprises a toner and a carrier, wherein the surface of the carrier is coated with a silicone resin comprising a urethane-modified silicone as an essential component.

The present invention includes, as an embodiment, a developer composition for electrostatic latent images which comprises a carrier comprising a core material and a surface layer and a toner comprising a binder resin and a colorant, wherein the surface of a core material is coated with the surface layer which is produced with the use of an organic resin having at least two groups selected from the group consisting of a hydroxyl group and a group giving a hydroxyl group in the reaction system, a relatively low molecular weight silicone resin for modification having at least two groups selected from the group consisting of a hydroxyl group and a group giving a hydroxyl group in the reaction system, a crosslinking agent and a polyisocyanate compound.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The toner to be used in the present invention may be any conventional toner, which comprises a binder resin, a colorant and, if necessary, optional components.

The binder resin for the toner according to the present invention may include styrenic resins, epoxy resins, polypropylene resins, vinyl ester resins, polyethylene resins, or polyesters, among which polyesters are preferable.

Although a polyester serves as a good binder having excellent fixability by virtue of the high cohesive energy of the ester group and the presence of terminal carboxyl groups therein, a polyester mainly composed of a polybasic carboxylic acid or a lower alkyl ester thereof represented by the following general formula (I) as the polybasic acid component and a diol represented by the following general formulas (II) or (III) as the polyol component is preferable from the standpoint of securing the storage stability of the toner:

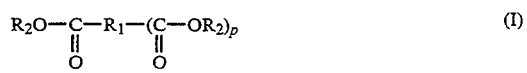

wherein p is an integer of 1 to 5, preferably 1 to 3; $R_1$ is a benzene ring; and $R_2$ is a hydrogen atom or a lower alkyl group having 1 to 8 carbon atoms,

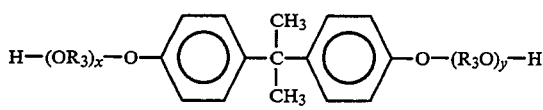
(II)

wherein $R_3$ is an alkylene group having 2 to 4 carbon atoms, preferably 2 to 3 carbon atoms; and x and y are each a positive integer, for example, an integer of 1 to 10, and

(III)

wherein $R_4$ is an alkylene group having 2 to 6 carbon atoms, preferably 2 to 5 carbon atoms.

The polybasic acid component preferably comprises a mixture of polybasic carboxylic acids represented by the above formula (I) containing 6 to 60 mole %, preferably 6 to 50 mole % of polybasic carboxylic acids represented by the above formula (I) wherein p is an integer of 2 to 5. The polyol component preferably comprises a mixture of diols represented by the above formula (II) which has the sum total of x and y of 2 to 10, preferably 2 to 6 on the average.

It is particularly preferable that the polyester comprises terephthalic acid or a lower alkyl ester thereof as the main component of the polybasic carboxylic acid. Both the fixability and the hot offset resistance of the toner can be easily obtained by using, as the polybasic acid component, a proper amount of a tribasic or higher carboxylic acid, such as trimellitic acid, lower alkyl ester thereof, which are compounds represented by the above general formula (I), or an anhydride thereof. When the content of such a tribasic or higher carboxylic acid in the polybasic acid component is too low, no effect will be attained, while when the content is too high, the acid value of the resulting polyester will be so high that the chargeability of the toner will be poor or the crosslink density of the resin will be too high. Therefore, it is preferable that the content of such a tribasic or higher carboxylic acid in the polybasic acid component range from 6 to 60 mole %.

Meanwhile, the diol represented by the above formula (II) includes polyoxypropylene bisphenol A, polyoxyethylene bisphenol A, and one represented by the above formula (III) includes ethylene glycol, propylene glycol, 1,6-hexanediol and 1,4-butanediol.

It is preferable that the polyester to be used in the present invention have a softening point of 120° to 180° C., preferably 120° to 140° C., as determined with a Koka type flow tester. When a polyester having a softening point below 120° C. as determined with a Koka type flow tester, is used as the binder resin, hot offset is liable to occur during heat roller fixing, though favorable fixability can be obtained so that the application of a silicone oil on the roller will be necessary. Further, the service life of the developer will tend to be short. In other words, the number of copies printable with excellent quality of copy or print (the image density and the fog) will tend to be small. Although a toner prepared by using a polyester having a softening point exceeding 180° C. as a binder resin is liable to exhibit poor fixability, the fixability can be improved by using a polyester comprising at least one monomer which can give a flexibility to the resulting polyester. Of course, such a monomer can also be copolymerized to give a polyester having a softening point below 180° C. and an improved fixability.

The monomer which can give a flexibility to the resulting polyester includes the following diols and dicarboxylic acids:

diols:
ethylene glycol, diethylene glycol, propylene glycol, dipropylene glycol, 1,6-hexanediol, 1,4-butanediol, and so on.

dicarboxylic acids:
fumaric acid, succinic acid, adipic acid, a succinic acid derivative having an alkyl or alkenyl group having 4 to 12 carbon atoms at a carbon atom constituting its ethylene portion, anhydrides and lower alkyl esters thereof, and so on.

The polyester to be used in the present invention can be prepared by polycondensing a polybasic acid component with a polyol component in an inert gas atmosphere at a temperature of 180° to 250° C. In this preparation, any conventional esterification catalyst may be used for accelerating the reaction. Examples of the catalyst include zinc oxide, stannous oxide, dibutyltin oxide and dibutyltin dilaurate. The polycondensation may be conducted under reduced pressure for the same purpose.

The colorant to be used in the preparation of the toner according to the present invention together with the above binder resin includes carbon black, Phthalocyanine Blue, Rhodamine B Base, nigrosine dye, chrome yellow, lamp black, oil black and mixtures of two or more of them. The colorant is generally used in an amount of about 1 to 15 parts by weight, preferably 3 to 10 parts by weight, based on 100 parts by weight of the binder resin. Carbon black is a particularly preferable colorant.

Further, a known charge control agent may be used for controlling the chargeability of the toner, if necessary. In the present invention, charge control agents which are known to be used for electrophotography may be used.

Examples of the negative charge control agents to be used in the present invention include metal-containing azo dyes such as "Varifast Black 3804", "Bontron S-31", "Bontron S-32", "Bontron S-34", "Bontron S-36" (all these products are manufactured by Orient Chemical Co., Ltd.), and "Aizen Spilon Black TVH" (manufactured by Hodogaya Chemical Co., Ltd.); copper phthalocyanine dyes; metal complexes of alkyl derivatives of salicylic acid such as "Bontron E-85" (manufactured by Orient Chemical Co., Ltd.); quaternary ammonium salts such as "COPY CHARGE NX VP 434" (manufactured by Farbwerke Hoechst AG) and the like.

It is also possible to simultaneously use the main charge control agent, i.e., the negative charge control agent, together with the contrary polar charge control agent. When the contrary polar charge control agent is used in an amount of one-half or less of the amount of the main charge control agent, excellent visible images can be obtained with no reduction in image density, even after 50,000 copies.

As the positive charge control agent, one or more compound(s) selected from positive charge control agents which are known to be used in the electrophotography may be used. Examples of the positive charge control agents include nigrosine dyes such as "Nigrosine Base EX", "Oil Black BS", "Oil Black SO", "Bontron N-01" and "Bontron N-11" (all products are manufactured by Orient Chemical Co., Ltd.); triphenylmethane dyes having a tertiary amine as a side chain such as "COPY BLUE PR" (manufactured by Farbwerke Hoechst AG); quaternary ammonium salts such as "Bontron P-51" (manufactured by Orient Chemical Co., Ltd.), "COPY CHARGE PX VP 435" (manufactured by Farbwerke Hoechst AG) and cetyltrimethylammonium bromide; polyamine resins such as "AFP-B" (manufactured by Orient Chemical Co., Ltd.); and the like.

The above charge control agent may be contained in the toner in an amount of 0.1 to 8.0% by weight, preferably 0.2 to 5.0% by weight, based on the amount of the binder resin.

Furthermore, a known additives for a toner may be used in the present invention. Examples of the additives include a wax; a compound for improving flowability of the obtained toner, such as a hydrophobic powder e.g., a hydrophobic silica, a colloidal silica, alumina, titania or polymer beads; and a polyolefin such as a polyethylene of low molecular weight and a polypropylene of low molecular weight.

The carrier to be used in the present invention comprises a core material and a surface layer comprising a silicone resin having a urethane bond, and the surface of the core material is coated with the surface layer.

The core material according to the present invention may comprise any conventional carrier and examples thereof include ferrite, iron, and magnetite carriers. Among them, ferrite and magnetite carriers are desirable in respect of the versatility of their use.

It is important that the silicone resin to be used in the present invention for coating the core material has a urethane bond in its molecule. Namely, the silicone resin should be a urethane-modified silicone resin. In general, the silicone resin has plural urethane bonds.

The kind of the urethane-modified silicone resin is not particularly limited. The urethane-modified silicone resin may be a commercially available resin, or may be freshly prepared. In the present invention, the use of a urethane-modified and crosslinked silicone resin as the urethane-modified silicone resin is preferable. The term "crosslinked silicone resin" used in this specification refers to a silicone resin prepared with the use of a crosslinking agent.

The urethane-modified silicone resin can be prepared by reacting a silicone having at least two groups selected from the group consisting of a hydroxyl group and a group giving a hydroxyl group during the reaction, such as a methoxy group, with polyisocyanate compound. The urethane-modified and crosslinked silicone resin can be prepared by reacting an organic resin having at least two groups selected from the group consisting of a hydroxyl group and a group giving a hydroxyl group during tile reaction, a relatively low molecular weight silicone resin having at least two groups selected from the group consisting of a hydroxyl group and a group giving a hydroxyl group during the reaction, a crosslinking agent and a polyisocyanate compound under heating at 250° C. or above. The organic resin and the relatively low molecular weight silicone resin have the hydroxyl group and/or the group giving a hydroxyl group preferably at the end of the molecule.

The organic resin is preferably a silicone having a relatively high molecular weight, and examples thereof include various modified silicones such as epoxy-, acrylic- and polyester-modified silicones; and ordinary silicones such as methyldimethylsilicone (copolymer comprising a methyl siloxane part and a dimethyl siloxane part) and methylphenylsilicone. More specially, examples of the organic resins include SR2400 and TR115 (a product of Dow Corning Toray Silicone Co., Ltd.), and KR251 and KR253 (a product of Shin-Etsu Silicone Co., Ltd.).

The relatively low molecular weight silicone resin includes KR305 (a product of Shin-Etsu Silicone Co., Ltd.) and TSR175 (a product of Toshiba Silicone Co., Ltd.), SH6018 (a product of Dow Corning Toray Silicone Co., Ltd.) and DC6-2230 (a product of Dow Corning Toray Silicone Co., Ltd.).

The group giving a hydroxyl group during the reaction includes an alkoxy group, such as a methoxy group.

Examples of the crosslinking agents include ketoxime, methyltrimethoxysilane, methyltriethoxysilane and γ-mercaptopropyltrimethoxysilane.

The polyisocyanate compound includes diisocyanates such as toluene diisocyanate (TDI) and diphenylmethane diisocyanate (MDI); polyisocyanates having three or more isocyanate groups such as dimethyltriphenylmethane tetraisocyanate and triphenylmethane triisocyanate; and modified isocyanate compounds. More specially, examples of the polyisocyanate compounds include Coronate 2031 (a product of Nippon Polyurethane Industry Co., Ltd.), CR35 (a product of Toshiba Silicone Co., Ltd.) and D-110N (a product of Takeda Yakuhin Co., Ltd.).

Though it is thought that the above-described starting materials for the surface layer of the carrier, i.e., the organic resin, the relatively low molecular weight silicone resin, the crosslinking agent and the polyisocyanate compound, react with each other to produce the silicone resin having a urethane bond according to the present invention, the reaction mechanism is not clearly understood or certain. Namely, the surface layer of the carrier according to the present invention may be one produced with the use of an organic resin having at least two groups selected from the group consisting of a hydroxyl group and a group giving a hydroxyl group in the reaction system, a relatively low molecular weight silicone resin for modification having at least two groups selected from the group consisting of a hydroxyl group and a group giving a hydroxyl group in the reaction system, a crosslinking agent and a polyisocyanate compound. The organic resin is preferably a silicone having a relatively high molecular weight.

The content of the sum total of the relatively low molecular weight silicone resin and the polyisocyanate compound in the raw materials for the silicone resin, i.e., the surface layer, according to the present invention is preferably 5 to 80% by weight, still more preferably 10 to 70% by weight and particularly preferaby 15 to 50% by weight. When the content is less than 5% by weight, the mechanical strength of the resulting surface layer and reactivity during preparation of the silicone resin, i.e., the surface layer, is so poor that the quality of a print formed under high-temperature and high-humidity conditions with the use of the resulting developer composition is little improved, while when it exceeds 80% by weight, the heat resistance and weathering resistance of the resulting developer composition will be so poor that significant fog will occur in non-image areas unfavorably.

The process for preparing the carrier, that is, the process for coating the core material with the silicone resin according to the present invention, is not limited. When two or more raw materials are used for the preparation of the silicone resin, i.e., the surface layer, the raw materials may be premixed and the obtained raw material mixture may be blended with a core material. Alternatively, simultaneously mixing a core material with the raw materials for the preparation of the silicone resin may be conducted. The former process which comprises premixing the raw materials for the preparation of the silicone resin with each other sufficiently, and coating a core material with the obtained mixture, is more preferable.

The coating may be conducted by any dry or wet processes. The wet process comprises dispersing the raw materials for the preparation of the silicone resin in a volatile solvent such as methanol or ethanol, mixing the obtained dispersion with a core material and removing the solvent, while the dry process comprises mixing the powdery raw materials as such with a core material. To react the raw materials for the preparation of the silicone resin with each other, heating may be conducted after mixing the raw materials with the core material in the above wet or dry process.

When a commercially available urethane-modified silicone resin is employed, the urethane-modified silicone resin is dispersed in a volatile solvent, the obtained dispersion is mixed with a core material, and then the solvent is removed in wet process. Alternatively, the powdery commercially available urethane-modified silicone resin as such is mixed with a core material in a dry process.

The amount of the silicone resin, i.e., the urethane-modified silicone resin, or the amount of the surface layer used for coating a core material is 0.2 to 1.6 parts by weight, preferably 0.6 to 1.2 parts by weight, based on 100 parts by weight of the core material. When the amount is less than 0.2 part by weight, the quality of the print formed under high-temperature and high-humidity conditions will be little improved, while when it exceeds 1.6 parts by weight, the function of the resulting carrier will be hindered unfavorably.

The developer composition for visualizing electrostatically charged images, that is, for electrostatic latent images, according to the present invention is generally prepared by mixing 100 parts by weight of the carrier with 2 to 10 parts by weight, preferably 2.5 to 10 parts by weight, of a toner in a twin-cylinder mixer or the like.

By using the developer composition of the present invention, electrostatically charged images, that is, electrostatic latent images, can be well developed to give high-quality prints even under high-temperature and high-humidity conditions and under low-temperature and low-humidity conditions under which the developer compositions according to the prior art has failed.

EXAMPLES

The present invention will now be described by referring to the following Examples, though the present invention is not limited by them.

Carrier Preparation Example 1

0.3 part by weight of a mixture prepared by premixing a methyldimethylsilicone resin, SR2400 (a product of Dow Corning Toray Silicone Co., Ltd.) with 5% by weight, based on the amount of SR2400, of a ketoxime as a crosslinking agent, 0.2 part by weight of a relatively low molecular weight silicone resin for modification, KR305 (a product of Shin-Etsu Silicone Co., Ltd.) and 0.1 part by weight of Coronate 2031 (a polyisocyanate compound, a product of Nippon Polyurethane Industry Co., Ltd.) were dispersed in methyl ethyl ketone to give a coating dispersion. 100 parts by weight of spherical ferrite as a core material was spray-coated with the above coating dispersion by the use of a flow coater. The core material thus coated was thermally treated in a fluidized vessel at 300° C. for 30 minutes to give an electrophotographic carrier C-1 which comprises spherical ferrite as a core material and a surface layer comprising a urethane-modified and crosslinked silicone resin according to the present invention.

Carrier Preparation Example 2

0.7 part by weight of a mixture prepared by premixing a methyldimethylsilicone resin, SR2400 (a product of Dow Corning Toray Silicone Co., Ltd.) with 5% by weight, based on the amount of SR2400, of methyltrimethoxysilane as a crosslinking agent, 0.15 part by weight of a relatively low molecular weight silicone resin for modification, TSR 175 (a product of Toshiba Silicone Co., Ltd.) and 0.05 part by weight of Coronate 2031 (a polyisocyanate compound, a product of Nippon Polyurethane Industry Co., Ltd.) were dispersed in methyl ethyl ketone to give a coating dispersion. 100 parts by weight of spherical ferrite as a core material was spray-coated with the above coating dispersion by the use of a flow coater. The core material thus coated was thermally treated in a fluidized vessel at 300° C. for 30 minutes to give an electrophotographic carrier C-2 which comprises spherical ferrite as a core material and a surface layer comprising a urethane-modified and crosslinked silicone resin according to the present invention.

Carrier Preparation Example 3

The same procedure as that of the Carrier Preparation Example 1 was repeated except that spherical magnetite was used as the core material. Thus, another electrophotographic carrier C-3 according to the present invention was obtained.

Carrier Preparation Example 4

0.2 part by weight of a mixture prepared by premixing a methyldimethylsilicone resin, SR2400 (a product of Dow Corning Toray Silicone Co., Ltd.) with 5% by weight, based on the amount of SR2400, of methyltrimethoxysilane as a crosslinking agent, 0.6 part by weight of a relatively low molecular weight silicone resin for modification, TSR175 (a product of Toshiba Silicone Co., Ltd.) and 0.2 part by weight of Coronate 2031 (a polyisocyanate compound, a product of Nippon Polyurethane Industry Co., Ltd.) were dispersed in methyl ethyl ketone to give a coating dispersion. 100 parts by weight of spherical magnetite as a core material was spray-coated with the above coating dispersion by the use of a flow coater. The core material thus coated was thermally treated in a fluidized vessel at 300° C. for 30 minutes to give an electrophotographic carrier C-4 which comprises spherical magnetite as a core material and a surface layer comprising a urethane-modified and crosslinked silicone resin according to the present invention.

Carrier Preparation Example 5

The same procedure as that of the Carrier Preparation Example 2 was repeated except that a coating dispersion prepared by dispersing 0.3 part by weight of a mixture prepared by premixing a methyldimethylsilicone resin, SR2400 (a product of Dow Corning Toray Silicone Co., Ltd.) with 5% by weight, based on the amount of SR2400, of methyltrimethoxysilane as a crosslinking agent, 0.40 part by weight of a relatively low molecular weight silicone resin for modification, TSR175 (a product of Toshiba Silicone Co., Ltd.) and 0.20 part by weight of Coronate 2031 (a polyisocyanate compound, a product of Nippon Polyurethane Industry Co., Ltd.) in methyl ethyl ketone was used. Thus, another carrier according to the present invention, C-5, was obtained.

Carrier Preparation Example 6

The same procedure as that of the Carrier Preparation Example 2 was repeated except that a coating dispersion prepared by dispersing 0.9 part by weight of a mixture prepared by premixing a methyldimethylsilicone resin, SR2400 (a product of Dow Corning Toray Silicone Co., Ltd.) with 5% by weight, based on the amount of SR2400, of methyltrimethoxysilane as a crosslinking agent in methyl ketone ethyl was used. Thus, another carrier, C-6, was obtained.

Toner Preparation Example 1

175 g of polyoxypropylene(p=2.0, an average value) bisphenol A, 162.5 g of polyoxyethylene(p=2.0, an average value) bisphenol A, 83 g of terephthalic acid, 38.4 g of trimellitic anhydride, 53.6 g of dodecenylsuccinic acid and stannous oxide as a catalyst were fed into a four-necked flask fitted with a stirrer, a reflux condenser, a thermometer and a nitrogen gas inlet tube. The contents of the flask were heated to 220° C. and polycondensed under stirring in a nitrogen atmosphere to give a pale-yellow resin. 100 parts by weight of this resin, 8 parts by weight of carbon black, Mogul L (a product of Cabot Corporation), 1.5 parts by weight of a charge control agent, Bontron S-34 (a product of Orient Chemical Corp.) and 3.0 parts by weight of a wax, NP-105 (a product of Mitsui Petrochemical Industries Ltd.) were together melt-kneaded, pulverized and classified to give an untreated toner having a mean particle diameter of 8 μm. 100 parts by weight of this untreated toner was mixed with 0.5 part by weight of a hydrophobic silica, R 972 (a product of Nippon Aerosil) under stirring to give an electrophotographic toner T-1.

Toner Preparation Example 2

175 g of polyoxypropylene(p=2.0, an average value) bisphenol A, 162.5 g of polyoxyethylene(p=2.0, an average value) bisphenol A, 120.4 g of terephthalic acid, 9.6 g of trimellitic anhydride, 53.6 g of dodecenylsuccinic acid and stannous oxide as a catalyst were fed into a four-necked flask fitted with a stirrer, a reflux condenser, a thermometer and a nitrogen gas inlet tube. The contents of the flask were heated to 220° C. and polycondensed in a nitrogen atmosphere under stirring to give a pale-yellow resin. This resin was treated in the same manner as that of the Toner Preparation Example 1 to give another electrophotographic toner T-2.

Toner Preparation Example 3

Toluene was fed into a four-necked flask fitted with a stirrer, a reflux condenser, a thermometer and a nitrogen gas inlet tube and heated to 90° C. A solution comprising 1000 g of styrene, 200 g of butyl acrylate and 30 g of azobisisobutyronitrile was dropped into the flask under stirring in a nitrogen atmosphere. The contents of the flask were stirred at 100° C. for 4 hours. Then, a solution comprising 1000 g of styrene, 200 g of butyl acrylate and 6 g of azobisisobutyronitrile was dropped into the flask while keeping the contents at 90° C. After the contents were stirred for 2 hours, the toluene in the contents was distilled out by raising the temperature of the contents gradually and then by evacuation. Thus, a transparent resin was obtained. This resin was treated in the same manner as that of the Toner Preparation Example 1 to give another electrophotographic toner T-3.

Example 1

1000 parts by weight of the electrophotographic carrier C-1, prepared in the Carrier Preparation Example 1, was mixed with 40 parts by weight of the toner T-1, prepared in the Toner Preparation Example 1, by the use of a 5-1 blender type-V (i.e., twin-cylinder mixer) to give a developer composition. This developer composition was applied to a commercially available electrophotographic copying machine fitted with a selenium photoreceptor (a magnetic brush development system) to conduct printing in a low-temperature and low-humidity environment (10° C. and 20% RH), in an ordinary-temperature and ordinary-humidity environment (25° C. and 50% RH) and in a high-temperature and high-humidity environment (35° C. and 85% RH). The obtained copies formed in a low-temperature and low-humidity environment (10° C. and 20% RH) and in a high-temperature and high-humidity environment (35° C. and 85% RH) had high quality little inferior to that of the copy formed in an ordinary-temperature and ordinary-humidity environment (25° C. and 50% RH). The printing was continuously repeated twenty thousand times in each environment to give excellent copies without causing any change as compared with those formed initially with regard to the image density and the fog. The image density and fog were determined by the use of an image densitometer RD914 (mfd. by Macbeth).

Examples 2 to 8 and Comparative Examples 1 to 3

In a similar manner to that of Example 1, developer compositions were prepared from the carriers and toners listed in Table 1 and a continuous copying test was conducted using the developer compositions under various environmental conditions. The image density and fog were determined by the use of an image densitometer RD914 (mfd. by Macbeth).

TABLE 1

| | | Carrier No. | Toner No. | ordinary temp. and humidity (25° C./50%) | | high temp. and humidity (35° C./85%) | | low temp. and humidity (10° C./20%) | |
|---|---|---|---|---|---|---|---|---|---|
| | | | | initial | after 20000 copying runs | initial | after 20000 copying runs | initial | after 20000 copying runs |
| Ex. | 1 | C-1 | T-1 | ○ | ○ | ○ | ○ | ○ | ○ |
| | 2 | C-1 | T-2 | ○ | ○ | ○ | ○ | ○ | ○ |
| | 3 | C-1 | T-3 | ○ | ○ | ○ | Δ | ○ | Δ |
| | 4 | C-2 | T-1 | ○ | ○ | ○ | ○ | ○ | ○ |
| | 5 | C-2 | T-2 | ○ | ○ | ○ | ○ | ○ | ○ |
| | 6 | C-3 | T-1 | ○ | ○ | Δ | Δ | ○ | ○ |
| | 7 | C-4 | T-1 | ○ | ○ | ○ | ○ | ○ | ○ |
| | 8 | C-5 | T-1 | ○ | Δ | Δ | Δ | ○ | Δ |
| Comp. Ex. | 1 | C-6 | T-1 | ○ | Δ | Δ | × | Δ | × |
| | 2 | C-6 | T-2 | ○ | Δ | Δ | × | Δ | × |
| | 3 | C-6 | T-3 | ○ | Δ | × | × | × | × |

In the above Table, ○, Δ and × represent the levels of image density and fog.

○: print having an image density of 1.4 or above and a fog of 0.01 or below

Δ: print in which one of the image density and fog does not reach the level of the rank "○".

×: print in which neither density nor fog reaches the level of the rank "○".

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A developer composition for electrostatic latent images which comprises:
   (A) a carrier comprising:
      (1) a core material, and
      (2) a surface layer coating said core material comprising a silicone-containing resin containing a urethane bond; and
   (B) a toner comprising:
      (1) a binder resin, and
      (2) a colorant.

2. The developer composition for electrostatic latent images as set forth in claim 1, wherein the silicone-containing resin is prepared by reacting:
   (A) an organic resin having at least two groups selected from the group consisting of a hydroxyl group and a group giving a hydroxyl group in the reaction system;
   (B) a relatively low molecular weight silicone resin having at least two groups selected from the group consisting of a hydroxyl group and a group giving a hydroxyl group in the reaction system;
   (C) a crosslinking agent; and
   (D) a polyisocyanate compound.

3. The developer composition for electrostatic latent images as set forth in claim 2, wherein the organic resin comprises a silicone resin having a relatively low molecular weight.

4. The developer composition for electrostatic latent images as set forth in claim 1, wherein the binder resin comprises a polyester resin.

5. The developer composition for electrostatic latent images as set forth in claim 1, which comprises 100 parts by weight of the carrier and 2 to 10 parts by weight of the toner.

6. The developer composition for electrostatic latent images as set forth in claim 1, wherein the carrier comprises 100 parts by weight of the core material and 0.2 to 1.6 parts by weight of the silicone resin.

7. The developer composition for electrostatic latent images as set forth in claim 1, wherein the toner comprises 100 parts by weight of the binder resin and 1 to 15 parts by weight of the colorant.

8. The developer composition for electrostatic latent images as set forth in claim 1, wherein the toner further comprises a compound selected from the group consisting of a charge control agent, a wax, a hydrophobic powder, a colloidal silica, alumina, titania, a polymer bead, and a polyolefin.

9. The developer composition for electrostatic latent images as set forth in claim 1, wherein the toner further comprises a compound selected from the group consisting of a charge control agent, a wax, and a hydrophobic silica.

10. A developer composition for electrostatic latent images which comprises:
    (A) a carrier comprising:
       (1) a core material; and
       (2) a surface layer coating said core material produced by the reaction of:
          (a) an organic resin having at least two groups selected from the group consisting of a hydroxyl group and a group giving a hydroxyl group in the reaction system;
          (b) a relatively low molecular weight silicone resin having at least two groups selected from the group consisting of a hydroxyl group and a group giving a hydroxyl group in the reaction system;
          (c) a crosslinking agent: and
          (d) a polyisocyanate compound; and
    (B) a toner comprising:
       (1) a binder resin; and
       (2) a colorant.

11. The developer composition for electrostatic latent images as set forth in claim 10, wherein the organic resin comprises a silicone having a relatively high molecular weight.

12. The developer composition for electrostatic latent images as set forth in claim 10, wherein the carrier comprises 100 parts by weight of the core material and 0.2 to 1.6 parts by weight of the surface layer.

* * * * *